C. W. VAN WINKLE.
AUTOPLANE.
APPLICATION FILED OCT. 7, 1909.
974,846.
Patented Nov. 8, 1910.
3 SHEETS—SHEET 1.
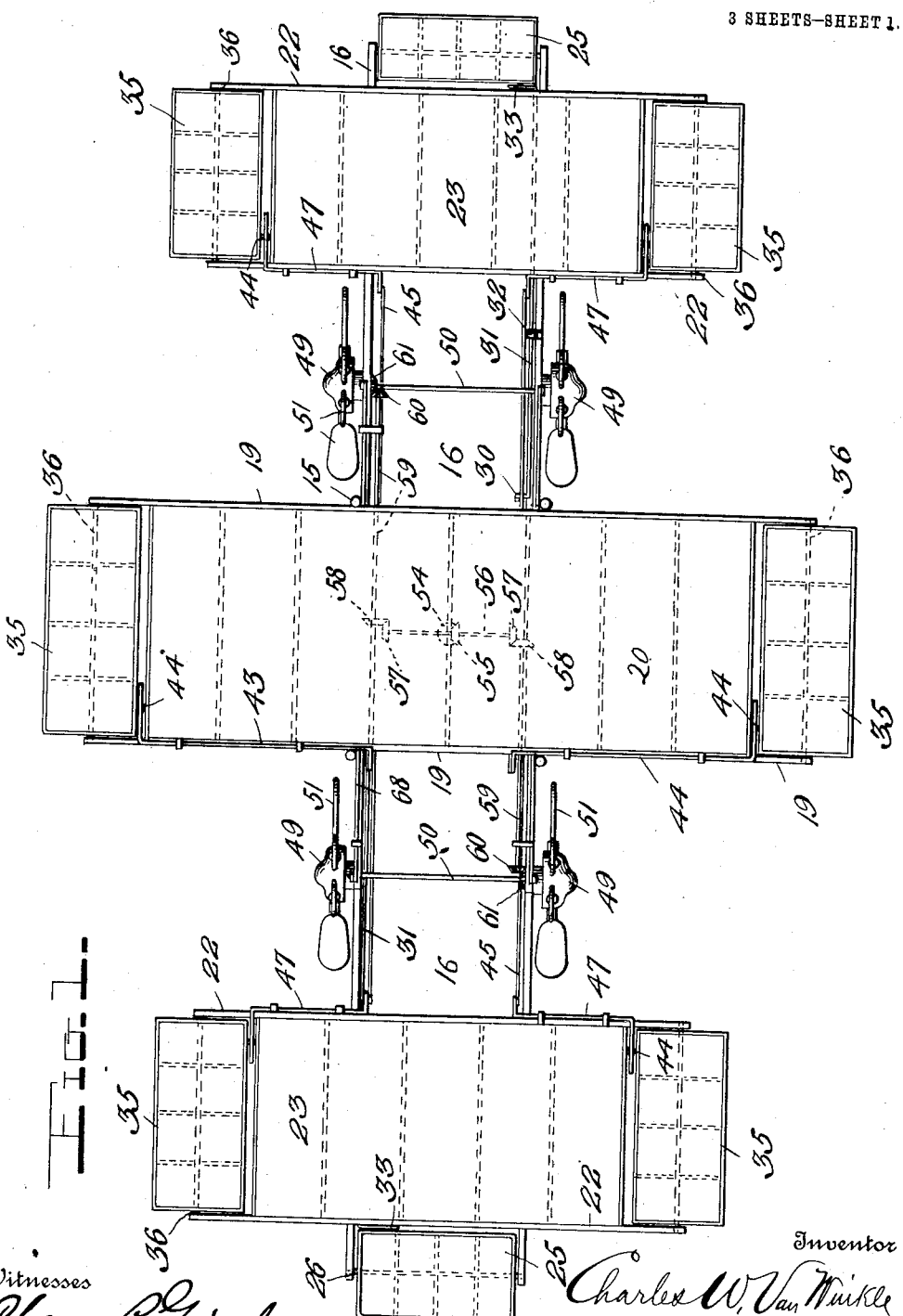
Witnesses
Chas. L. Grieshauer.
E. M. Ricketts
Inventor
Charles W. Van Winkle
By Watson E. Coleman
Attorney

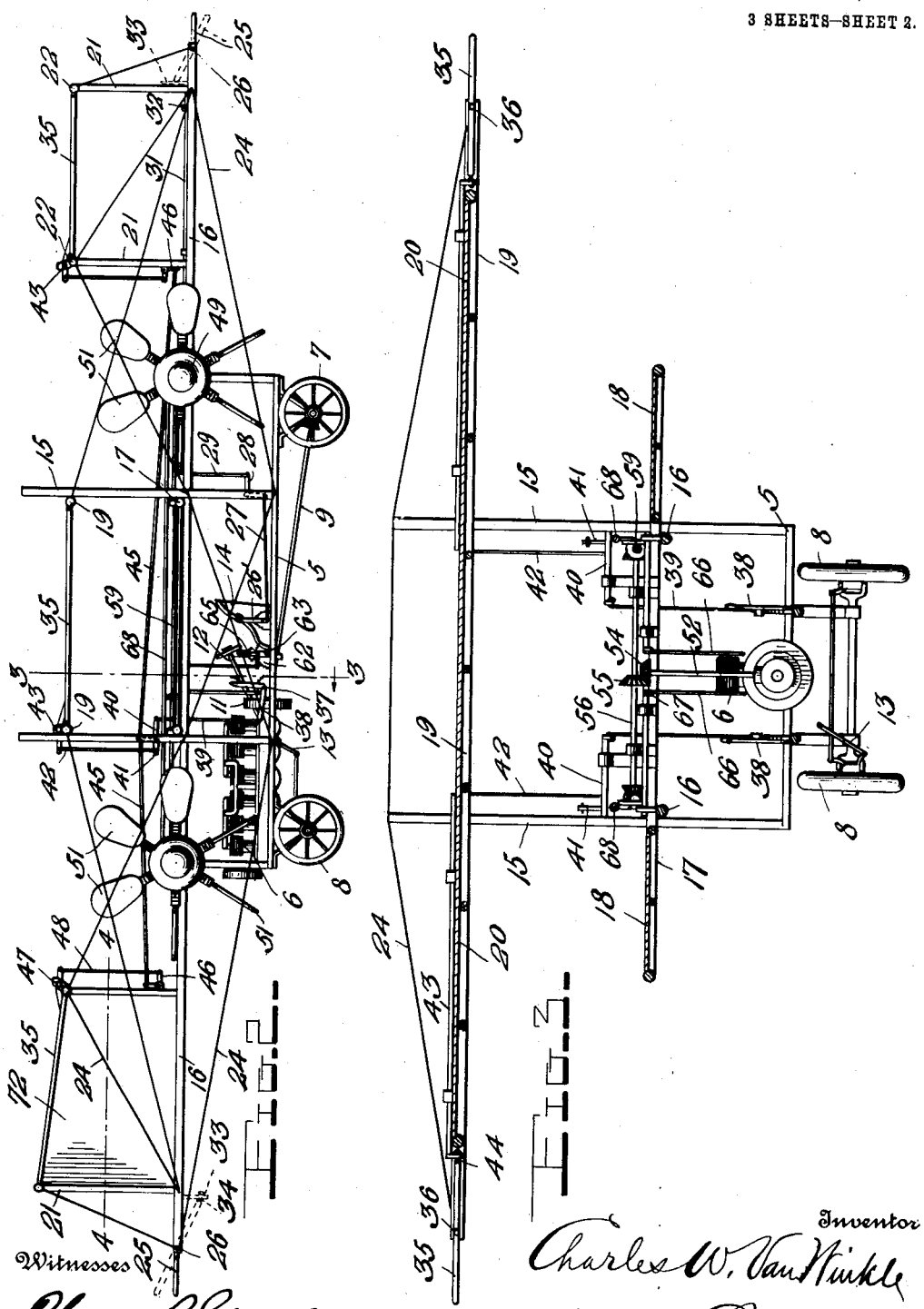

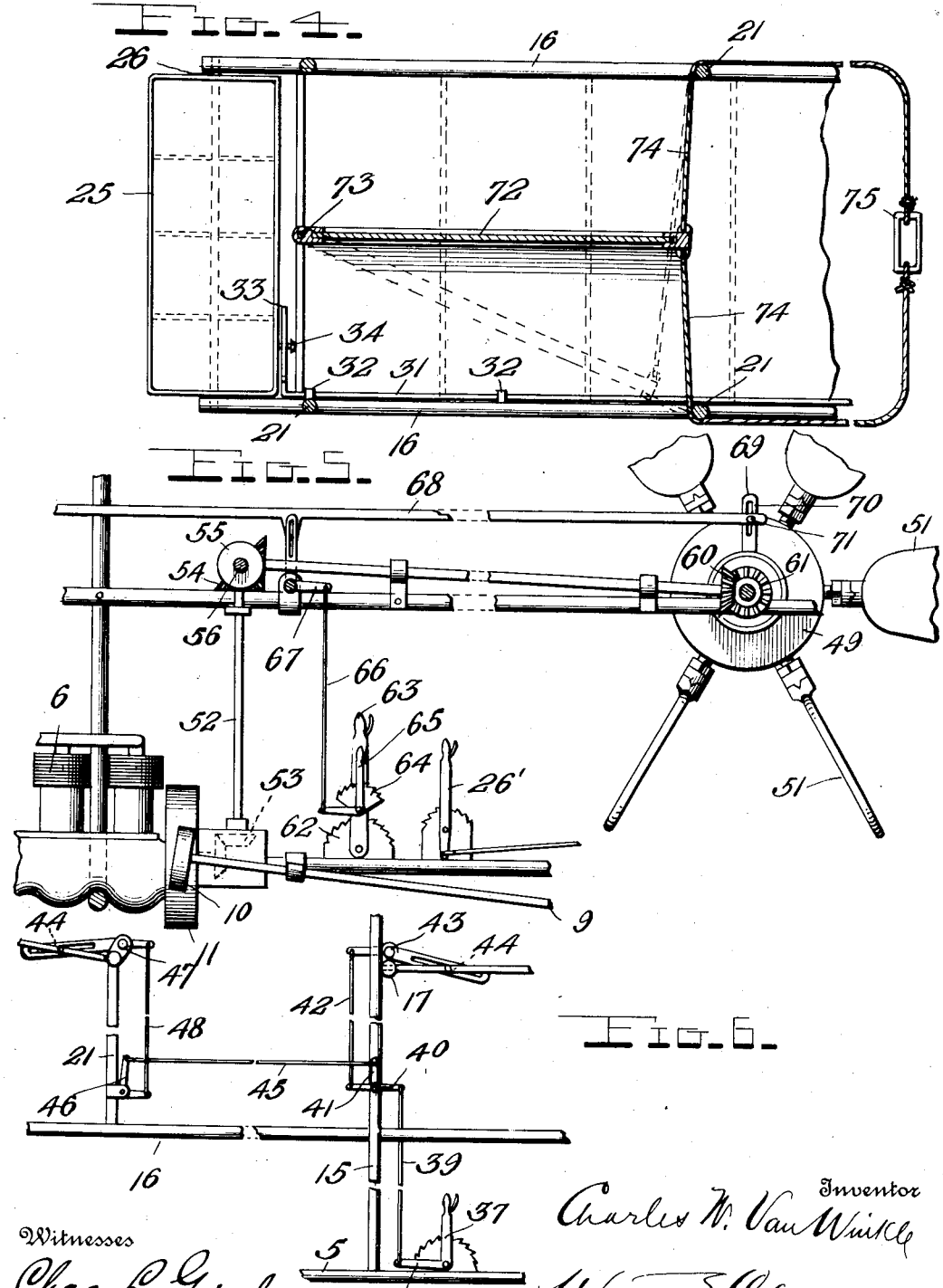

UNITED STATES PATENT OFFICE.

CHARLES W. VAN WINKLE, OF WHITE PLAINS, NEW YORK, ASSIGNOR OF ONE-HALF TO ROBERT CONKLIN, OF PLEASANTVILLE, NEW YORK.

AUTOPLANE.

974,846.  Specification of Letters Patent.  Patented Nov. 8, 1910.

Application filed October 7, 1909. Serial No. 521,525.

*To all whom it may concern:*

Be it known that I, CHARLES W. VAN WINKLE, a citizen of the United States, residing at White Plains, in the county of Westchester and State of New York, have invented certain new and useful Improvements in Autoplanes, of which the following is a specification, reference being had to the accompanying drawings.

This invention relates to certain new and useful improvements in flying machines, and has for its object to provide a plurality of aeroplanes suitably mounted and supported and comprising a longitudinal plane and a plurality of superposed transversely positioned planes, the frame being mounted upon a wheeled carrier which is adapted to move over the ground and impart the initial flight impulse to the machine.

Another object is to provide a flying machine which is of such construction that the necessity of providing a starting incline is obviated, the machine carrying its own starting and propelling mechanism and having means for preventing the falling of the machine during its flight.

A further object is to provide a machine of this character consisting of a longitudinal plane and superposed transverse planes, at the end of each of which an oscillatory wing or blade is pivotally mounted, suitable operating means being connected thereto and extending to the operator's seat, whereby said wings may be adjusted to direct the flight of the machine and to retain its vertical and transverse equilibrium in the air.

A still further object is to provide a flying machine of the aeroplane type wherein a plurality of propellers are provided having feathering blades, means being provided whereby a number of the blades of the propellers on each side of the machine may be simultaneously feathered.

A still further object is to provide a vertically positioned pivotally mounted wing located beneath the forward transverse aeroplane, said wing being transversely movable to maintain the machine in its proper vertical position in adverse air currents.

With these and other objects in view, the invention consists of the novel construction, combination and arrangement of parts hereinafter fully described and claimed, and illustrated in the accompanying drawings, in which—

Figure 1 is a top plan view of a flying machine constructed in accordance with the present invention; Fig. 2 is a side elevation thereof; Fig. 3 is a transverse section taken on line 3—3 of Fig. 2; Fig. 4 is a detail horizontal section taken on the line 4—4 of Fig. 2; Fig. 5 is an enlarged detail side elevation illustrating the means for feathering the propeller blades; and Fig. 6 is a similar view showing the means for angularly positioning the lateral equalizing wings.

In the ordinary construction of flying machines wherein one or more aeroplanes are employed, the machine is sustained in the air by reason of the contact between the air and the under surface of the aeroplanes. The movement of the machine is derived from the wind blowing in the opposite direction to that in which the machine is traveling together with the forward movement of the machine as it is started down an incline from an elevated position. It is the object of the present invention to eliminate the necessity for employing this starting incline, and to provide a machine which carries its own starting and propelling means. To this end I provide the carrying and supporting frame 5 in which the motor 6 is mounted. Traction wheels 7 and 8 are rotatably mounted beneath the opposite ends of this frame, the power being applied thereto from the motor by means of the longitudinally extending shaft 9 which is provided at one end with a friction wheel 10 engaged with the periphery of the flying wheel 11. The rear end of the shaft 9 has secured thereon a bevel gear which is engaged with a similar gear on the rear wheel shaft, thus propelling the machine over the ground. The forward steering wheels 8 are operated by the steering rod 12 through the connections 13. The rod 12 is provided with a hand wheel located in close proximity to the operator's seat 14.

Secured to the carrying frame 5 at its opposite sides and adjacent to the ends thereof are the uprights 15. Extending laterally from these uprights is the longitudinal aeroplane 16, the frame of which extends between and is rigidly secured to the uprights 15. The aeroplane 16 is preferably formed by stretching and securing cloth or canvas between the frame bars, the inner ends of the canvas being secured to the transversely extending bars 17. The frame bars 17 protrude beyond the frame of the aeroplane 16 and have secured thereto the short wings or rudders 18 which are adapted to assist the machine in keeping its proper vertical position during flight. To the upper ends of the uprights 15 the transversely extending frame bars 19 are secured to which are secured the cloth or other fabric 20 thus constituting a lateral superposed aeroplane which extends a considerable distance beyond the ends of the short wings 18. At the opposite ends of the frame bars of the aeroplane 16 the vertical posts 21 are secured, to the upper ends of which are secured the transverse frame bars 22 which are of less length than the bars 19. Canvas or cloth is also secured to the bars 22 thus providing the superposed transverse aeroplanes 23. The aeroplanes 20 and 23 are preferably in the same horizontal plane, although of course it is within the scope of my invention to alter the respective positions of these planes in any manner which may be later found more desirable. The various frame elements are connected by the truss rods 24, which also connect and support the various planes on the carrying frame 5.

The above constitutes the basic elements of the machine, and I will now specifically describe the manner in which the machine is elevated in the air and sustained in proper equilibrium during its flight. It will be noted that the material comprising the main longitudinal aeroplane and the transverse aeroplanes terminates short of the ends of the frame bars. Between the extremities of the bars of the longitudinal aeroplane, a flight directing wing 25 is pivoted upon a transverse connecting rod 26, and is adjustable between the frame bars to angularly position these wings with relation to the direction of flight of the machine. For reasons which are obvious these wings are separately adjustable, the specific construction of such adjusting means being capable of a wide range of modification. In the drawings, however, I have illustrated what I believe to be the preferred arrangement of such adjusting means which comprises a rack and lever 26' mounted upon the carrying frame 5 in juxtaposition to the operator's seat 14. One of these operating levers is disposed upon each side of the seat and is pivoted between its ends upon the rack segment. To the lower extremity of the lever one end of a rod 27 is secured, the opposite end of which is pivotally connected to a bell crank 28. A link rod 29 connects the horizontal arm of the bell crank to the upper end of an angular extension 30 on the inner end of a longitudinal rock shaft 31 which is mounted in suitable bearings 32 on the frame of the aeroplane 16. The outer end of each of these rods is inwardly extended at a right angle as shown at 33 and is formed with a slot therein for sliding connection with a pin 34 disposed therethrough, said pin being carried by the wing 25. Thus it will be seen that upon the manipulation of the operating lever, the bell crank will be oscillated to rotate the rock shaft which through its sliding connection with the pin 34 will angularly position the wing 25 in the ends of the frame of the aeroplane 16 as clearly shown in Fig. 2. The necessity for and the function of such construction will hereinafter appear.

Wings 35 similar to the wings 25 are pivotally mounted upon the connecting shaft 36 in the ends of the transverse frame bars 19 and 22. These wings are also angularly adjustable such adjustment being accomplished in the following manner: It will be noted that the wings 35 upon opposite sides of the longitudinal aeroplane 16 are individually operable, although each set of wings beyond the ends of the transverse aeroplane are simultaneously adjustable. As the operating means is precisely the same in each instance, the detail description of one will suffice for both. A rack and lever 37 is mounted on the carrying frame 5 adjacent to the operator's seat, said lever being connected by a link 38 at its lower end to a connecting rod 39, the upper end of which is pivoted to the angular inner end of a transverse shaft 40, the outer end of which is engaged in the vertical upright 15. A bell crank 41 is carried by or may be formed integrally with the shaft 40 to the horizontal arm of which the connecting rod 42 is secured and extends upwardly and is pivotally engaged with the angular extremity of the transverse rock shaft 43, the outer end of which is extended at right angles and slotted to receive the pin 44 secured in the wing 35. The connecting rod 42, however, only rocks the shaft 43 connected to the central wings. In order to simultaneously operate the wings of the end aeroplanes, the vertical arm of the bell crank 41 is connected by means of the rod 45 to a bell crank 46 mounted on one of the frame posts 21, the horizontal arm of the bell crank 46 being connected to the crank of the transverse shaft 47 by means of the vertical connecting rod 48, the outer end of the rock shaft being connected to the wing 35 as above described. Thus it will be seen that when the operating lever is manipulated the rock shafts 43 and 47 will be rotated through the medium of the connecting rods 39, 42, 45 and 48 to angularly position the wings 35 upon one side of the machine. This adjustment of the wings may be instantly and simultaneously accomplished to give the aeroplane the full benefit of the air currents, the disposition of these wings depending entirely upon the direction of movement of the air currents.

In order to propel the machine as well as assist in the elevation of the same, I provide a plurality of propellers 49 upon the opposite sides of the machine. The propellers on each side of the longitudinal vertical center of the machine are arranged in transverse alinement upon the opposite ends of a common shaft 50. These propellers each comprises a plurality of feathering blades 51, the blades of each of the propellers being simultaneously feathered. I effect this result by providing a central vertical shaft 52, the lower end of which is geared to the motor shaft as shown at 53, the upper end carrying a miter gear 54 which engages with a similar gear 55 carried by the transverse shaft 56. Upon the opposite ends of the shaft 56 a gear 57 is secured which engages with the gear 58 upon the end of the longitudinal shaft 59. The shafts 59 are rotated on opposite sides of the machine and are each provided with a miter gear 60 at its outer end which engages with a similar gear 61 secured on the shaft 50. It will thus be seen that when the motor is started, rotary movement will be transmitted through the vertical shaft 52, the transverse shaft 56 and the longitudinal shafts 59 to the propeller shafts, which will consequently be rotated in a common direction. The mechanism by means of which the propeller blades are feathered is preferably similar to that shown in the prior application for patent filed by me March 27, 1909, Serial No. 486,257, allowed September 21, 1909. The construction of this blade feathering mechanism will therefore not be here set forth in detail, but the means by which this mechanism is actuated will now be specifically set forth.

Each pair of propellers located on opposite sides of the machine and between the transverse aeroplanes as shown in Fig. 1, have their blades simultaneously feathered, such feathering mechanism being of such construction that any desired number of blades on each propeller may be feathered. In order to easily and quickly feather the propeller blades I provide a rack 62 carried by the frame 5 upon which the primary operating lever 63 is pivoted, said lever carrying a suitable spring actuated dog for engagement with the teeth of the rack. Upon the opposite sides of this lever a rack 64 is secured to which the bell crank lever 65 is pivoted. The horizontal arm of this lever is connected by a rod 66 to the corresponding arm of a bell crank 67 the vertical arm of which has movable connection with a longitudinally movable bar or rod 68 the opposite ends of which are connected to an arm 69 which actuates the blade feathering mechanism. This arm is provided with a slot 70 for the reception of the pin 71 in the end of the bar 68. By employing such construction for feathering the propeller blades it will be obvious that the blades may be feathered at such a point in their rotation as to offer the least resistance to the air currents, while at the same time the full advantage of the propelling force of the propellers, will be obtained. When it is desired to change the feathering point of the propeller blades on each side of the machine simultaneously, the lever 63 is manipulated whereby the longitudinally disposed bars 68 are moved in unison, the auxiliary levers 65 being locked on the primary lever 63. When, however, it is desired to change the feathering point of the propeller blades upon only one side of the machine, one of the levers 65 may be released from locking engagement with the rack 64 to move the connections between the same and the longitudinally movable bar 68.

A vertical wing 72 is disposed between the transverse aeroplane at the forward end of the machine and the longitudinal aeroplane 16. This wing is pivoted upon a vertical rod 73 mounted at its upper and lower ends in the frame bars. At the rear end of the wing 72, the ends of suitable operating cables 74 are secured, said cables extending around the vertical supporting post 21 and having their other ends connected to the member 75 which is adapted to be grasped by the operator to swing the wing 72 transversely between the aeroplanes. By such construction the liability of the machine to be tipped over by a heavy gust of wind striking upon one side of the machine will be avoided, as the wing may be moved to the position shown in dotted lines in Fig. 4, thus breaking the force of the wind and righting the machine. The short central transverse wings 18 will assist the wing 72 in maintaining the proper equilibrium of the machine during its flight. The wings 18 are fixed to the frame structure and in addition to assisting the wing 72 in balancing the machine, they also increase the stability of the structure, and relieve the central transverse plane of considerable strain.

In operation, when the motor 6 is operated the traction wheels 7 and 8 will move the machine over the ground, and when sufficient momentum has been acquired the tiltable wings 25 at the opposite ends of the longitudinal aeroplane are angularly adjusted to receive the impact of the air currents and direct the forward end of the machine upwardly. The wings are then turned to their normal horizontal position so that the entire machine will move in a horizontal plane during its flight after a sufficient elevation has been attained. The propellers 49 are simultaneously rotated upon the operation of the motor, the blades being feathered during their rotation to direct the air against the under surface of the aeroplanes to the greatest advantage without impeding the forward progress of the machine thus accomplishing a two fold function and greatly increasing the buoyancy of the machine to overcome the weight of the motor and the wing operating mechanisms. The wings 35 at the ends of the transverse aeroplanes are now positioned in accordance with the direction in which the wind may be blowing, and together with the lateral wings 18 will maintain the equilibrium of the machine and sustain its proper flying position. When it is desired to descend the wings 25 are moved so that their outer edges are positioned below the aeroplane 16, the wind striking the upper surface of the wings 25. The motive power is gradually reduced, and the machine will thus descend and alight without shock or jar to the occupants.

From the foregoing it will be seen that I have provided a flying machine of comparatively simple construction wherein every possible exigency which might arise is provided for, the entire machine being so arranged and proportioned that the least impediment is offered to its flight. The provision of a plurality of planes in combination with the propellers disposed with relation thereto as before described renders it possible for the machine to sustain considerable weight without impairing its efficiency or flying proclivities.

It will be apparent that numerous minor modifications may be resorted to in the construction and arrangement of the various parts without materially departing from the essential features or sacrificing any of the advantages of the invention, and I desire it to be understood that I do not wish to be restricted to the precise construction illustrated and set forth in the claims, but reserve the right to incorporate such modifications as may fairly fall within the scope of the claims.

Having thus described the invention, what is claimed is—

1. In a flying machine, a longitudinal aeroplane and a plurality of transverse aeroplanes arranged in superposed relation to the longitudinal aeroplane, a pivoted wing arranged at the ends of each of said aeroplanes, in combination with means for angularly positioning said wings with relation to the plane of said aeroplane.

2. In a flying machine, a longitudinal aeroplane and a plurality of transverse aeroplanes arranged in superposed relation to the longitudinal aeroplane, a pivoted wing arranged at the end of said aeroplanes, in combination with means for adjusting the wings at the ends of the longitudinal aeroplane in angular relation to the line of flight, and additional means for simultaneously positioning the wings at one end of the transverse aeroplanes in angular relation to the plane of said transverse aeroplanes at the opposite ends thereof.

3. In a flying machine, a longitudinal aeroplane and a plurality of transverse aeroplanes arranged in superposed relation to the longitudinal aeroplane, a pivoted wing arranged at the ends of each of said aeroplanes, a wing centrally and laterally extending from the opposite sides of the longitudinal aeroplane, in combination with means for angularly positioning the wings at the ends of the longitudinal aeroplane with relation to the line of flight, and additional means for simultaneously positioning the wings at the ends of the transverse aeroplanes on opposite sides of the longitudinal aeroplane at an angle to the plane of said transverse aeroplanes.

4. In a flying machine, the combination with a wheeled frame, of a longitudinal aeroplane supported on said frame, a plurality of transverse aeroplanes arranged in superposed relation to the longitudinal aeroplane, standards rigidly connecting said aeroplanes with each other, a pivoted wing arranged at the ends of each of said aeroplanes, and means for angularly positioning said wings with relation to the plane of said aeroplanes.

5. In a flying machine, the combination with a wheeled frame, of a longitudinal aeroplane supported above said frame, a transverse aeroplane arranged in superposed relation to the longitudinal aeroplane at the opposite ends thereof, a transverse aeroplane disposed centrally above the longitudinal aeroplane and extending beyond the ends of the first named transverse aeroplanes, supporting standards rigidly connecting said aeroplanes to each other, a rudder pivoted at each end of the longitudinal aeroplane, means for independently operating said rudders to angularly position the same with relation to the line of flight, a wing pivotally arranged at the ends of each of the transverse aeroplanes, and means for simultaneously positioning the wings at one end of each of the transverse aeroplanes at an angle with relation to the plane of said transverse aeroplanes.

6. In a flying machine, the combination with a wheeled frame, of a longitudinal aeroplane and a plurality of superposed transverse aeroplanes rigidly connected and supported on said frame, said transverse aeroplanes being disposed in the same horizontal plane, a transversely extending wing rigidly secured to the frame and arranged beneath one of the transverse aeroplanes, a pivoted wing arranged at the opposite ends of each of said aeroplanes, the wings at the ends of the longitudinal aeroplane being independently operated to direct the vertical flight of the machine, means for operating said wings, and additional means for simultaneously operating the wings on the opposite ends of the transverse aeroplanes to angularly position the same, said wings being adapted to determine the longitudinal line of flight of the machine.

7. In a flying machine, the combination with a wheeled frame, of a longitudinal aeroplane and a plurality of superposed transverse aeroplanes rigidly connected and supported on said frame, said transverse aeroplanes being arranged above the opposite ends and the center of the longitudinal aeroplane, a central stationary wing extending transversely from the longitudinal wing, a transversely movable wing disposed between the longitudinal aeroplane and one of the transverse end aeroplanes, a wing pivotally arranged at the opposite ends of said longitudinal aeroplane, and means for independently positioning said wings at an angle to the line of flight.

8. In a flying machine, the combination with a wheeled frame, of a longitudinal aeroplane and a plurality of transverse aeroplanes rigidly connected and supported on said frame arranged in superposed relation to the longitudinal aeroplane, movable wings arranged at the ends of each of said aeroplanes, means for angularly positioning the wings with relation to the plane of the aeroplane to direct the line of flight, a wing pivotally mounted at one end between one of the transverse aeroplanes and the longitudinal aeroplane, said wing being transversely movable and adapted to maintain the vertical equilibrium of the machine, means for moving said wing, a central transversely extending wing disposed in substantially the same plane with the longitudinal aeroplane, truss rods connecting each of the aeroplanes with each other and with said frame, and a plurality of propellers arranged between said aeroplanes.

9. In a flying machine, the combination with a wheeled frame, of a longitudinal aeroplane, a transverse aeroplane arranged in superposed relation to the longitudinal aeroplane at its opposite ends, a central superposed transverse aeroplane extending beyond the ends of the first named transverse aeroplanes, standards rigidly connecting said aeroplanes to each other, said aeroplanes being supported upon said frame, truss rods connecting the aeroplanes to each other and to the frame, movable wings arranged at the opposite ends of said aeroplanes, means for angularly positioning the wings at the ends of the longitudinal aeroplane, additional means for simultaneously positioning the wings at the ends of the transverse aeroplane at a transverse inclination to the line of flight, a plurality of propellers carried by the longitudinal aeroplane, a motor positioned in the frame, and operating means between said motor and propellers for rotating the latter.

10. In a flying machine, a longitudinal aeroplane, and a plurality of transverse aeroplanes arranged in superposed relation to the longitudinal aeroplane, a pivoted wing arranged at each side of each of said aeroplanes, means for angularly adjusting said wings with relation to the planes, in combination with a plurality of propellers mounted on the frame of said machine on each side thereof, means for operating said propellers, said propellers having feathering blades, means for simultaneously changing the feathering point of the blades in the reversal of the propellers, and additional means for changing the feathering point of the propeller blades on one side of the machine with respect to those upon the other side thereof.

11. In a flying machine, the combination with a wheeled frame, of uprights carried by said frame, a longitudinal aeroplane secured between said uprights, front and rear superposed transverse aeroplanes rigidly connected to said longitudinal aeroplane, a transverse superposed aeroplane arranged between said uprights and extending beyond the ends of the first named transverse aeroplanes, flight directing members adjustably mounted in the opposite ends of each of said aeroplanes, means for independently positioning the members in the ends of the longitudinal aeroplane, means for simultaneously positioning the members in the ends of the transverse aeroplanes on one side of the longitudinal center of the machine, a pivoted transversely movable wing arranged between the forward transverse aeroplane and the longitudinal aeroplane, operating connections adapted to move said wing transversely between the aeroplanes to maintain the transverse equilibrium of the machine, a plurality of propellers carried by the longitudinal aeroplane, a motor mounted in said frame, operating connections between the motor shaft and propeller shaft to rotate said propellers, said propellers being provided with feathering blades, and means for simultaneously feathering the blades of the propellers on one side of the machine.

12. In a flying machine, the combination with a wheeled frame, of an aeroplane structure supported upon said frame, movable flight directing wings mounted in said structure, means for operating said wings, a plurality of propellers carried by said structure, said propellers being provided with feathering blades, a motor mounted in said frame, operating connections between said motor and the propeller shafts to rotate the latter, a longitudinally movable bar, said bar having its ends movably connected with the actuating arms of the feathering mechanisms, said bars being disposed at opposite sides of the machine, manually operated means for simultaneously operating said bars, and auxiliary operating means carried by said manually operated means for independently moving said bars to change the feathering point of the propeller blades.

13. In a flying machine, the combination with a wheeled frame, of an aeroplane structure comprising longitudinal and transverse aeroplanes rigidly connected and supported on said frame, transverse propeller shafts mounted on the longitudinal aeroplane, propellers secured to the opposite ends of said shafts, a motor mounted in said frame, a gearing connecting the motor shaft to the propellers' shafts to rotate said propellers, said propellers each comprising a plurality of feathering blades, the feathering mechanism having a rigidly projecting actuating arm, a longitudinal reciprocatory bar on the opposite sides of the longitudinal aeroplane, the ends of said bars having movable engagement with said actuating arms, an operating lever pivotally mounted in the frame to simultaneously actuate said bars, an auxiliary operating lever pivotally mounted on the opposite sides of the first named lever, a bell crank pivoted on the longitudinal aeroplane, said bell crank having movable engagement with said bar, a connecting rod between the bell crank and auxiliary operating levers, said auxiliary levers being adapted to independently move said bars to change the feathering point of the propeller blades, the first named operating lever being adapted to simultaneously move said bars to feather the blades of each of the propellers, and driving connections between said motor and the wheel shafts.

14. In a flying machine, the combination with a wheeled frame, of an aeroplane structure supported upon said frame, a plurality of oscillatory flight directing wings mounted in each side of said structure, an oscillatory flight directing wing mounted in each end of said structure, means for simultaneously adjusting the wings on opposite sides of said structure at a transverse inclination to the line of flight, additional means for simultaneously adjusting the end members at a horizontal inclination to the line of flight, a plurality of propellers rotatably mounted on each side of said structure, a motor mounted in said frame, operating connections between said motor and the propeller shafts to rotate said propellers, a longitudinally positioned reciprocating bar disposed on opposite sides of said structure, said propellers being provided with feathering blades, an actuating arm extending radially from said propellers adapted to actuate the feathering mechanism, the ends of said bars having movable connection with said arms and adapted to actuate the same, means for simultaneously reciprocating the bars on the opposite sides of said structure to change the feathering point of the propeller blades, and means for actuating the bar at one side of said structure independently of the bar at the other side of said structure.

In testimony whereof I hereunto affix my signature in the presence of two witnesses.

CHARLES W. VAN WINKLE.

Witnesses:
W. H. SMITH,
L. O. FARRELL.